July 16, 1957 P. E. CAIN 2,799,242
AUTOMATIC SALTING MACHINE
Filed Nov. 20, 1953 3 Sheets-Sheet 1
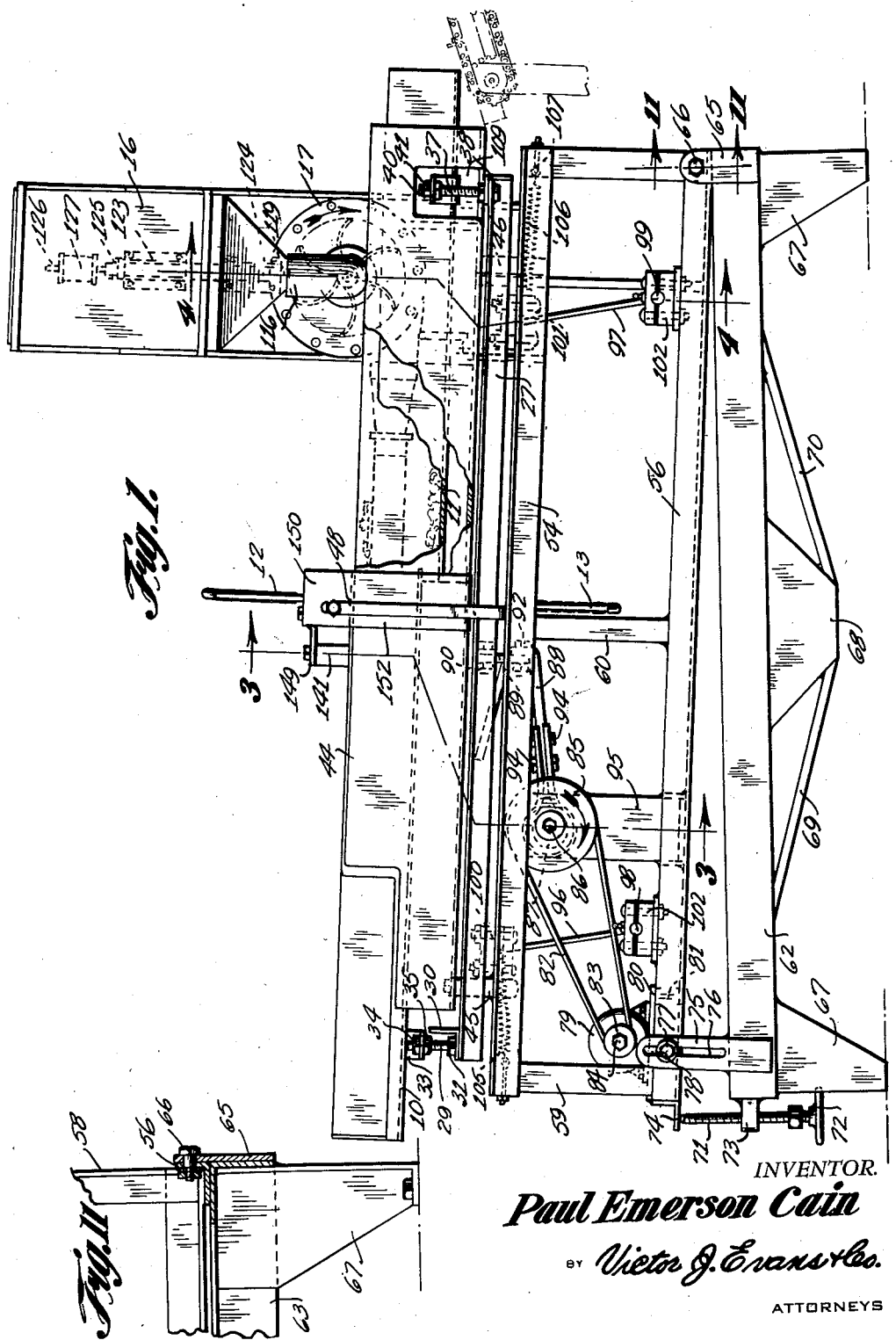
INVENTOR.
Paul Emerson Cain
BY Victor J. Evans & Co.
ATTORNEYS

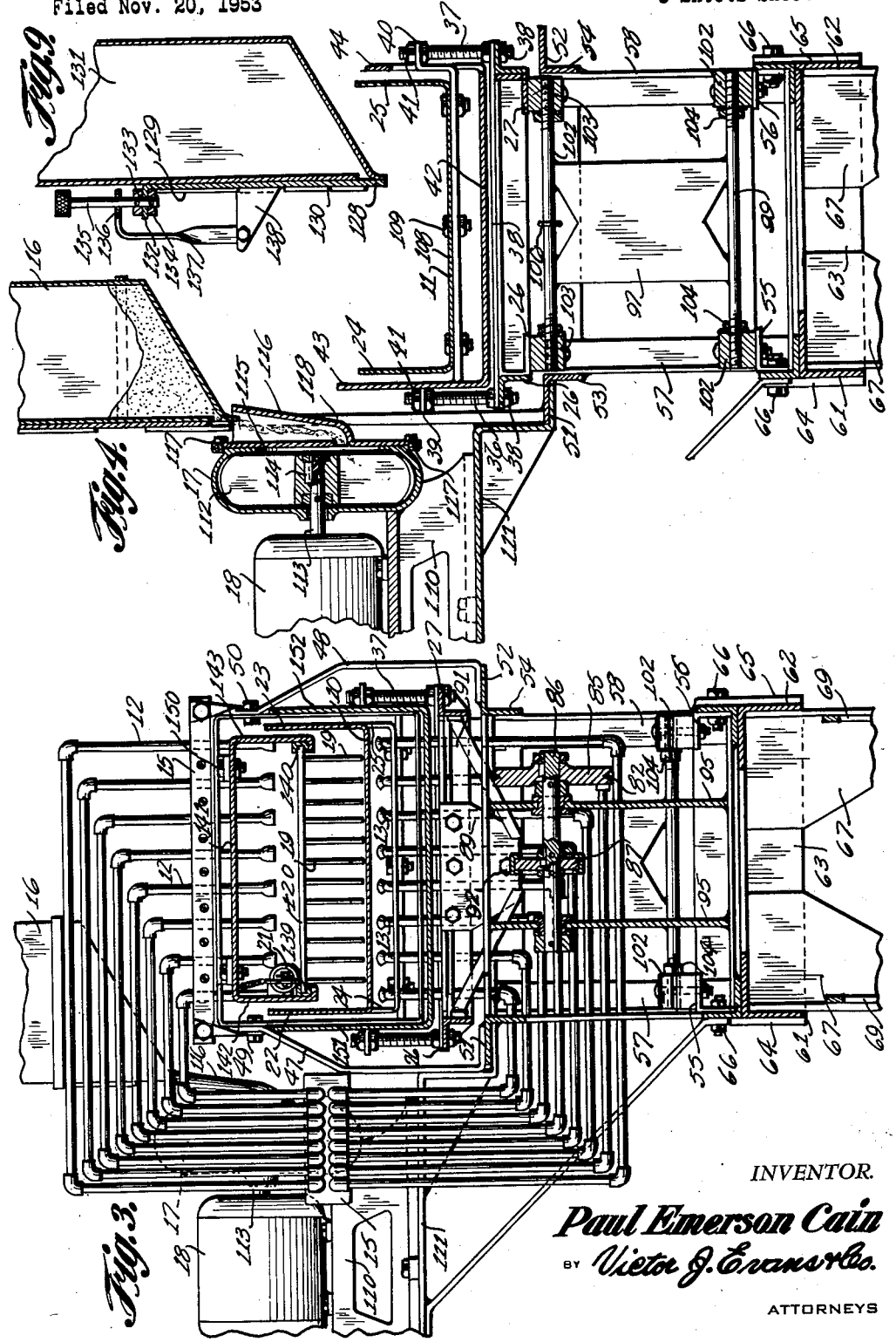

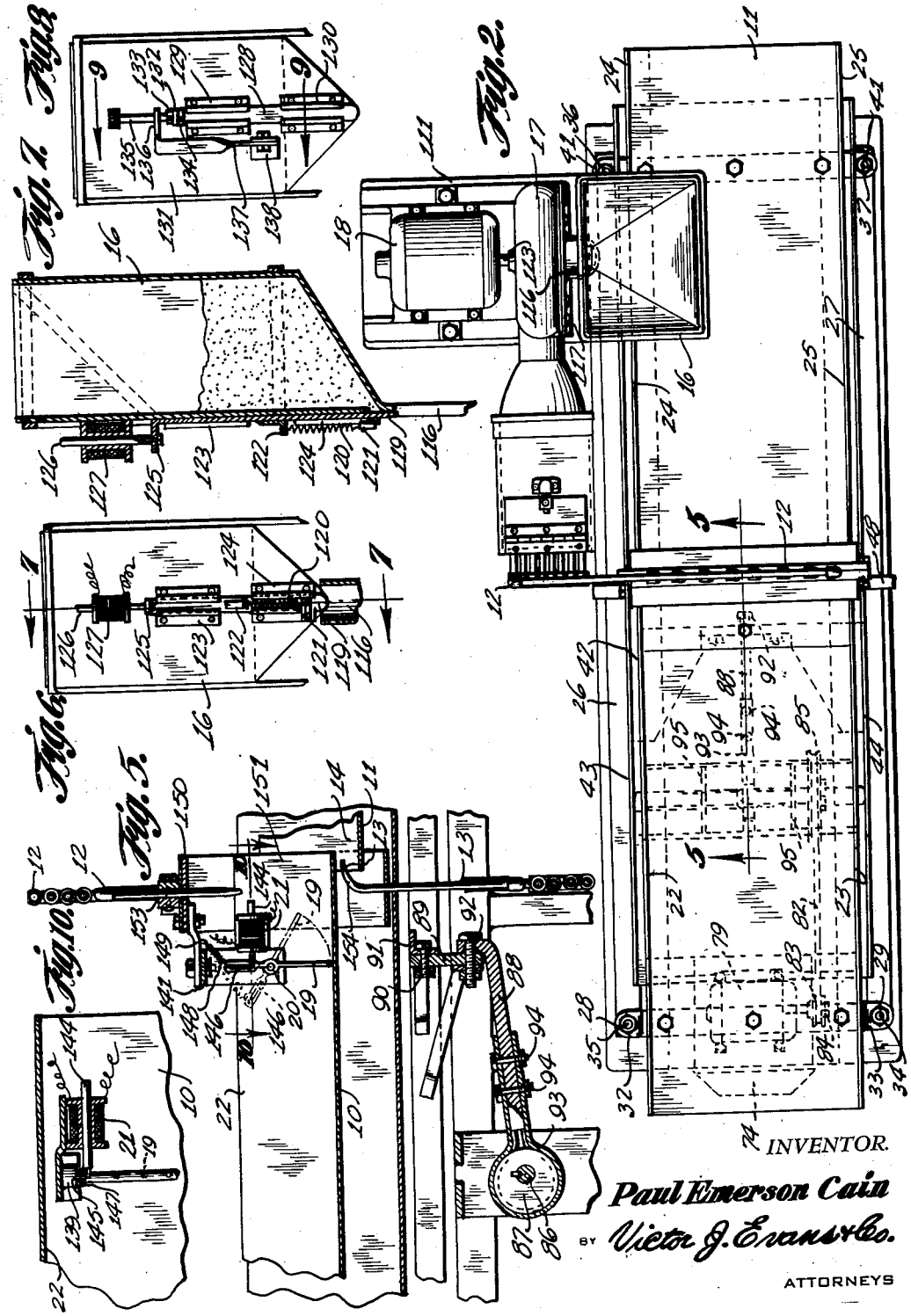

2,799,242
Patented July 16, 1957

2,799,242
AUTOMATIC SALTING MACHINE
Paul Emerson Cain, Bowling Green, Ohio

Application November 20, 1953, Serial No. 393,265

7 Claims. (Cl. 118—24)

This invention relates to a machine for salting potato chips and other products, and in particular an elongated shaked trough in which products, such as potato chips and the like may be placed and wherein salt, suspended in air under pressure is applied to the product whereby the salt is applied to all surfaces of the product and is evenly distributed on said surfaces.

The purpose of this invention is to provide means for applying salt to products, such as potato chips wherein the salt is evenly distributed over the entire outer surfaces of the product.

In the conventional type of potato chip machine salt is applied to one side of the potato chips, only, and as the salt is applied with the potato chips in a pan or trough it is difficult to reach the entire surface of even one side of each of the potato chips. With this thought in mind this invention contemplates evenly distributing potato chips over a shaker trough with the potato chips passing through a battery of nozzles from which salt is ejected with air under pressure.

The object of this invention is, therefore, to provide a machine for applying salt to products, such as potato chips in a trough wherein the positions of the potato chips are changed continuously by shaking the trough and wherein the potato chips are subjected to salt suspended in air, the salt being sprayed from batteries of nozzles by air under pressure.

Another object of the invention is to provide a machine for applying salt to products, such as potato chips, wherein the amount of salt and also the progress of potato chips through the machine can be electrically controlled with buttons on a control panel.

A further object of the invention is to provide an improved machine for applying salt to products, such as potato chips in which the salt is evenly distributed over the entire surfaces of the potato chips and in which the machine is of a comparatively simple and economical construction.

With these and other objects and advantages in view the invention embodies an elongated frame providing a stand, an elongated trough positioned above the stand and carried by rocker arms, a motor driven eccentric operatively connected to the trough for shaking the trough, upper and lower batteries of spray nozzles through which salt is sprayed upon potato chips in the trough with air under pressure, a control gate for regulating the progress of the potato chips through the trough and a salt bin and blower combination for supplying salt suspended in compressed air to the batteries of nozzles.

Other features and advantages of the invention will appear from the following description taken in connection with the drawings, wherein:

Figure 1 is a side elevational view illustrating the improved salt applying machine, part of one side of a shaker trough and mounting trough being broken away to illustrate the position of products in the trough.

Figure 2 is a plan view of the machine.

Figure 3 is a cross section through the machine taken on line 3—3 of Fig. 1 illustrating the upper and lower batteries of spray nozzles and also showing a control gate for regulating the progress of potato chips through the machine.

Figure 4 is a cross section taken on line 4—4 of Fig. 1 illustrating the salt bin and blower combination and also illustrating mounting elements of the shaker trough.

Figure 5 is a longitudinal section taken on line 5—5 of Fig. 2 with the ends of the machine broken away and showing, in particular, the upper and lower batteries of spray nozzles and also the control gate, the gate being shown in broken lines in an elevated position.

Figure 6 is a detail showing an elevational view of the front of the salt bin.

Figure 7 is a vertical section through the salt bin taken on line 7—7 of Fig. 6.

Figure 8 is a front elevational view of the salt bin, similar to that shown in Fig. 6, illustrating a modification wherein a gate of the bin is adjusted with a thumb screw.

Figure 9 is a vertical section through the bin shown in Fig 8 being taken on line 9—9 thereof, the parts being shown on an enlarged scale.

Figure 10 is a detail showing a section taken on line 10—10 of Fig. 5 also showing the solenoid for actuating the control gate.

Figure 11 is a detail showing a section taken on line 11—11 of Fig. 1 illustrating the pivotal mounting of the rocker trough supporting frame on the stand.

Referring now to the drawings wherein like reference characters denote corresponding parts the improved salting machine of this invention includes an elongated shaker trough having an upper section 10 and a lower section 11, a battery of upper spray nozzles or tubes 12 positioned above the trough, a battery of lower spray nozzles 13 positioned to spray salt through an opening 14 between the base of the upper trough 10 and the lower trough 11, a header 15 from which the spray nozzles extend, a salt bin 16 positioned to feed salt to a blower 17 driven by a motor 18, a gate having tines 19 extended from a bar 20 and actuated by a solenoid 21, and suitable means for mounting and adjusting the inclination of the trough.

The upper part 10 of the trough is provided with side walls 22 and 23 and the lower section 11 is provided with similar walls 24 and 25.

The shaker trough is carried by a shaker frame formed with side bars 26 and 27, the upper section 10 of the trough being mounted on the side bars with studs 28 and 29 and the studs are secured, preferably by welding to a cross bar 30, to which the heads of the studs are secured, as shown at the point 31. The studs extend through clip angles 32 and 33 on the sides of the trough, and the clip angles are adjustably secured in position on the studs with nuts 34 and 35. The opposite end of the trough, as indicated by the numeral 11, is supported with similar studs 36 and 37, as shown in Figure 4, the lower ends of the studs 36 and 37 extending through a cross bar 38 on the side bars or angles 26 and 27 and the parts being secured in assembled relation with nuts 38. The upper ends of the studs 36 and 37 extend through plates 39 and 40 extended from a bar bolted to the base of the section 11 of the shaker trough and the plates are adjustably secured in position upon the studs with nuts 41.

The shaker trough is positioned to operate in a stationary overflow tray having a base 42 with side walls 43 and 44 and this tray is supported with a bracket 45 at the front, a similar bracket 46 at the rear and arms 47 and 48 the upper ends of which are secured to the side walls 43 and 44 with bolts 49 and 50, respectively, and the lower ends of which are mounted, preferably by welding on flanges 51 and 52 of side bars 53 and 54, respectively, of a tilting frame positioned between the shaker trough and a supporting stand.

The side bars 53 and 54 of the tilting frame are supported from the lower bars 55 and 56 with posts 57 and 58 at the rear, similar posts 59 at the front and by intermediate posts, as indicated by the numeral 60. The intermediate or tilting frame is pivotally mounted on a stand including upper angle bars 61 and 62, connected at the ends with cross bars 63, with bearings 64 and 65 to which the side bars 55 and 56 are pivotally connected with bolts 66, as shown in detail in Fig. 11.

The angle bars 61 and 62 are supported with posts 67 at the corners and the intermediate portions of the bars are reinforced with truss members including gusset plates 68 and braces 69 and 70.

The intermediate or tilting frame is pivotally mounted in the bearings 64 and 65 with the bolts 66 at one end and the opposite end is adapted to be adjusted vertically with adjusting screws 71 having hand wheels 72 on the lower ends and the screws are threaded in sockets 73 extended from the cross members 63. The adjusting screws 71 are positioned whereby the upper ends engage an angle bar 74 positioned on the end of the tilting intermediate frame, whereby upon turning the screws 71 the elevation of the rear end of the tilting frame is readily adjustable.

The tilting frame is adapted to be secured in adjusted positions with vertically disposed plates 75 having elongated slots 76 therein and mounted on the outer surfaces of the angle bars 61 and 62 whereby studs extended from the lower bars 55 and 56 of the intermediate frame are positioned in the slots and after positioning the tilting frame with the adjusting screws 71 the studs 77 which extend from the bars 55 and 56 through the slots 76 are secured in adjusted positions with nuts 78.

The shaker trough is adapted to be actuated by a motor 79 positioned on a plate 80 that is reinforced with a strut 81 and a belt 82 trained over a pulley 83 on a motor shaft 84 and also over a pulley 85 on a countershaft 86 rotates the shaft 86 whereby an eccentric 87 also positioned on the shaft 86 actuates an arm 88 which is connected to a plate 9 on a cross bar 89 extended between the side bars 26 and 27 to which the cross bar 89 is secured with bolts 90 in angle bars 91. The plate 9 is secured to an upwardly extended end of the arm 88 with a bolt 92 and the arm is secured to the eccentric with a strap 93 that is positioned in a groove in the periphery of the eccentric and that is connected to the arm 88 with bolts 94. By this means the shaker frame, including the side bars 26 and 27 and trough, including the upper and lower sections 10 and 11, which are mounted on the bars 26 and 27 are reciprocated.

The shaft 86 upon which the eccentric 87 and pulley 85 are mounted is rotatably mounted in vertically disposed supports 95, as shown in Figs. 1 and 3.

The shaker trough and frame are carried by rocker arms 96 and 97, the lower ends of which are provided with shafts 98 and 99 and the upper ends of which are secured to shafts 100 and 101, respectively. The shafts 98 and 99 at the lower ends of the rocker arms are mounted by bearings 102 on the side bars 55 and 56 of the intermediate or tilting frame and the upper bars 100 and 101 are pivotally mounted in similar bearings 103, which are secured to the side bars 26 and 27. The upper and lower shafts of the rocker arms are retained in position with set collars 104.

Springs 105 and 106, positioned in the upper corners of the intermediate or tilting frame, retain the shaker trough and frame thereof in a neutral position, the springs being secured with eye bolts 107 to end members of the intermediate frame, at one end, and to the upper bearings 103 at the other.

As illustrated in Fig. 1, the plates or ends 39 and 40 of a bar 108 extend through openings 109 in the side walls 43 and 44 of the stationary overflow tray and the bar from which the ends or plates extend is secured to the section 11 of the shaker 12 with bolts 109.

The motor 18 is mounted on a stand 110 carried by a bracket 111 on one side of the intermediate or tilting frame and the impeller or rotor 112 of the blower 17 is mounted on the motor shaft 113, as shown in Fig. 4. The rotor of the blower is keyed to the shaft with a key 114. The intake side of the blower is provided with an opening 115 over which a chute 116 is secured with bolts 117 and the chute is positioned to receive salt from the bin 16 which is supported with struts 118 from the bracket 111.

In the design illustrated in Figs. 6 and 7 the bin 16 is provided with a gate 119 that is retained in the closed position with a spring 120, one end of which is secured to a clip 121 and the other to a member 122 on the gate whereby the gate is urged downwardly to the closed position, as shown in Fig. 7. The gate is slidably mounted in brackets 123 and 124 and the upper end is provided with a flange 125 to which a core 126 is connected and with the core extended through a solenoid 127 the gate is adapted to be elevated and opened as the solenoid is energized.

In the design illustrated in Figs. 8 and 9 a gate 128 slidably mounted in brackets 129 and 130 on the face of a salt bin 131 is provided with a flange 132 that is positioned between set collars 133 and 134 on an adjusting screw 135 and with the screw threaded in a hub 136 of an arm 137 extended from a bracket 138 the gate is opened and closed by turning the adjusting screws.

It will be understood that the gate of the salt bin may also be actuated by other suitable means.

Upon operation of the shaker trough with the shaking elements products, such as potato chips in the trough travel downwardly, the travel of the product being controlled by adjusting the angle of inclination of the trough by the adjusting screw 71 and the progress of the product through the trough may also be controlled by the gate formed with the tines 19 and shaft 20, the shaft being pivotally mounted in bearings 139 and 140 of a bracket 141 having depending arms 142 and 143.

The control gate is adapted to be actuated by a solenoid 21 having a core 144 on the end of which is a pin 145 that extends through a slot 146 in an arm 147 that extends upwardly from the member 20, as illustrated in Figs. 5 and 10 and as the solenoid 21 is energized, the core 144 moves outwardly rotating the member 20 whereby the tines 19 assume the positions indicated by the broken lines, in Fig. 5. A spring 148, attached to the upper end of the arm 146 at one end and to an arm 149 at the other returns the tines to the position shown in full lines in Fig. 5, as the solenoid is deenergized. By this means the products may be retained in the trough 10 and permitted to pass to the trough 11 by pressing a push button that may be positioned at a suitable point on the machine, as desired.

The bracket 141 is secured by the arms 149 to a support 150 that is mounted on the tilting frame with side plates 151 and 152 and, as illustrated in Figs. 3 and 5 the upper tubes 12 are secured in the support 150 with mounting members 153.

The lower ends of the upper tubes or nozzles 12 are flattened, as shown in Fig. 3 providing thin sprays and the nozzles or ends 154 of the lower tubes 13, which are also flattened, extend at an angle, as illustrated in Fig. 5 whereby salt being sprayed therefrom completely encloses products, such as potato chips passing from the upper section 10 to the lower section 11 of the shaker trough.

*Operation.*—Products to be salted, such as potato chips, are placed in the upper section 10 of the shaker trough and as the trough reciprocates the products assume different positions thereon whereby substantially all areas of the products are subjected to the salting process.

Salt drawn from the bin 16 and passing into the blower is driven with compressed air, in which the salt is suspended into the header 15 and from the header to the upper and lower batteries of tubes wherein as the salt is sprayed into the sections of the trough it completely surrounds all particles of products such as potato chips and the like in the trough. By this means the entire areas or the complete surfaces and particularly both sides of the potato chips are subjected to the salt spray and the salt is retained or remains on the potato chips.

It will be understood that other modifications, within the scope of the appended claims, may be made in the design and arrangement of the parts without departing from the spirit of the invention.

What is claimed is:

1. A salt applying machine comprising an inclined shaker trough having an elongated upper section and an elongated lower section with an opening between the bottom of the upper section and the bottom of the lower section and with the bottom of the upper section positioned in a plane spaced above a plane in which the bottom of the lower section is positioned, with the end of the bottom of the upper section overlapping the adjoining end of the bottom of the lower section, and providing an opening between the bottoms of the sections, a frame in which the sections of the trough are adjustably mounted, a stand upon which the frame is pivotally mounted, a battery of vertically disposed laterally spaced spray nozzles mounted in the frame and positioned to spray salt downwardly upon products in the trough, a battery of lower vertically disposed laterally spaced spray nozzles also mounted in the frame and positioned to spray salt through the opening between the bottom of the upper trough and the bottom of the lower trough, the sprays from said nozzles being adapted to agitate products on the trough, means for supplying salt suspended in air under pressure to said spray nozzles, means for adjusting the inclination of the trough, and means for reciprocating the trough longitudinally.

2. A salt applying machine comprising an inclined shaker trough having an upper section and a lower section with an opening between the bottom of the upper section and the bottom of the lower section and with the bottom of the upper section positioned in a plane spaced above a plane in which the bottom of the lower section is positioned, with the end of the bottom of the upper section overlapping the adjoining end of the bottom of the lower section, and providing an opening between the bottoms of the sections, a frame in which the sections of the trough are adjustably mounted, a stand upon which the frame is pivotally mounted, a battery of vertically disposed laterally spaced spray nozzles mounted in the frame and positioned to spray salt downwardly upon products in the trough, a battery of lower vertically disposed laterally spaced spray nozzles also mounted in the frame and positioned to spray salt through the opening between the bottom of the upper trough and the bottom of the lower trough, means for supplying salt suspended in air under pressure to said spray nozzles, means for adjusting the inclination of the trough, means for reciprocating the trough longitudinally, a control gate extended across the trough for regulating the passage of products in the trough, and means for actuating the control gate from a remote point.

3. A salt applying machine comprising an inclined shaker trough having an upper section and a lower section with an opening between the bottom of the upper section and the bottom of the lower section and with the bottom of the upper section positioned in a plane spaced above a plane in which the bottom of the lower section is positioned, with the end of the bottom of the upper section overlapping the adjoining end of the bottom of the lower section, and providing an opening between the bottoms of the sections, a frame in which the sections of the trough are adjustably mounted, a stand upon which the frame is pivotally mounted, a battery of vertically disposed laterally spaced spray nozzles mounted in the frame and positioned to spray salt downwardly upon products in the trough, a battery of lower vertically disposed laterally spaced spray nozzles also mounted in the frame and positioned to spray salt through the opening between the bottom of the upper trough and the bottom of the lower trough, means for supplying salt suspended in air under pressure to said spray nozzles, means for adjusting the inclination of the trough, means for reciprocating the trough longitudinally, a control gate extended across the trough for regulating the passage of products in the trough, means for actuating the control gate from a remote point, and a stationary overflow trough in which the shaker trough is positioned.

4. In a product spraying machine, the combination which comprises a stand, a tilting frame pivotally mounted, at one end thereof, on said stand, means positioned at the end of the tilting frame opposite to the end pivotally mounted on said stand for adjusting the inclination of the frame, a rocker frame positioned above the tilting frame, rocker arms pivotally mounted in the tilting frame and pivotally connected to the rocker frame, a shaker trough having upper and lower sections carried by the rocker frame said trough having a transversely disposed opening between the upper and lower sections and the bottom of the upper section being spaced above the bottom of the lower section, means for reciprocating the trough, upper and lower batteries of vertically disposed laterally spaced spray nozzles positioned to spray products on the trough, means for supplying materials suspended in compressed air to said spray nozzles the sprays from said nozzles being adapted to agitate the products in the trough, and means for controlling the progress of material on the trough.

5. In a product spraying machine, the combination which comprises a stand, a tilting frame pivotally mounted, at one end thereof, on said stand, means positioned at the end of the tilting frame opposite to the end pivotally mounted on said stand for adjusting the inclination of the frame, a rocker frame positioned above the tilting frame, rocker arms pivotally mounted in the tilting frame and pivotally connected to the rocker frame, a shaker trough having upper and lower sections carried by the rocker frame said trough having a transversely disposed opening between the upper and lower sections and the bottom of the upper section being spaced above the bottom of the lower section, means for reciprocating the trough, upper and lower batteries of vertically disposed laterally spaced spray nozzles positioned to spray products on the trough, means for supplying materials suspended in compressed air to said spray nozzles the sprays from said nozzles being adapted to agitate the products in the trough, means for controlling the progress of material on the trough, and means for regulating the amount of material sprayed with the air.

6. In a product spraying machine, the combination which comprises a stand, a tilting frame pivotally mounted, at one end thereof, on said stand, means positioned at the end of the tilting frame opposite to the end pivotally mounted on said stand for adjusting the inclination of the frame, a rocker frame positioned above the tilting frame, rocker arms pivotally mounted in the tilting frame and pivotally connected to the rocker frame, a shaker trough having upper and lower sections carried by the rocker frame said trough having a transversely disposed opening between the upper and lower sections and the bottom of the upper section being spaced above the bottom of the lower section, means for reciprocating the trough, upper and lower batteries of vertically disposed laterally spaced spray nozzles positioned to spray products on the trough, means for supplying materials suspended in compressed air to said spray nozzles the sprays from said nozzles being adapted to agitate the products in the trough, means for controlling the progress of material on the trough, and means for regulating the amount of material sprayed with the air, said lower spray nozzles being positioned to spray the material through the opening between the upper and lower sections of the trough.

7. A material applying machine comprising a stand, a frame pivotally mounted, at one end thereof, on one end of the stand, adjusting means connecting the end of the frame opposite to the end by which the frame is pivotally mounted on the stand to the stand, an elongated lower section of a trough having a bottom with side walls mounted on the end of the frame pivotally mounted on the stand, an elongated upper section of a trough also having a bottom and side walls mounted on the end of the frame adjustably connected to the stand, the bottom of the upper trough overlapping the bottom of the lower trough and the bottom of the said upper trough being in a plane spaced above the plane in which the bottom of the lower trough is positioned, means mounted on the frame for reciprocating the upper and lower sections of the trough with a longitudinally disposed vibrating action, an upper battery of vertically disposed spray nozzles mounted on the frame and positioned to spray material over the products in the trough, a lower battery of spray nozzles mounted on the frame and positioned to spray material through the opening between the ends of the bottoms of the troughs and upon products dropping from the upper section of the trough to the lower section, and means for supplying material suspended in fluid under pressure to the spray nozzles.

References Cited in the file of this patent

UNITED STATES PATENTS

| | | |
|---|---|---|
| 1,566,800 | MacArthur | Dec. 22, 1925 |
| 1,833,853 | Patrono et al. | Nov. 24, 1931 |
| 2,119,909 | Fery | June 7, 1938 |
| 2,197,792 | Erickson | Apr. 23, 1940 |
| 2,313,556 | Koepsel et al. | Mar. 9, 1943 |
| 2,347,164 | Petrilli | Apr. 18, 1944 |
| 2,360,460 | Williams | Oct. 17, 1944 |
| 2,556,058 | Boon | June 5, 1951 |
| 2,563,475 | Mahoney | Aug. 17, 1951 |
| 2,576,952 | Lowe et al. | Dec. 4, 1951 |
| 2,655,897 | Thompson | Oct. 20, 1953 |